UNITED STATES PATENT OFFICE.

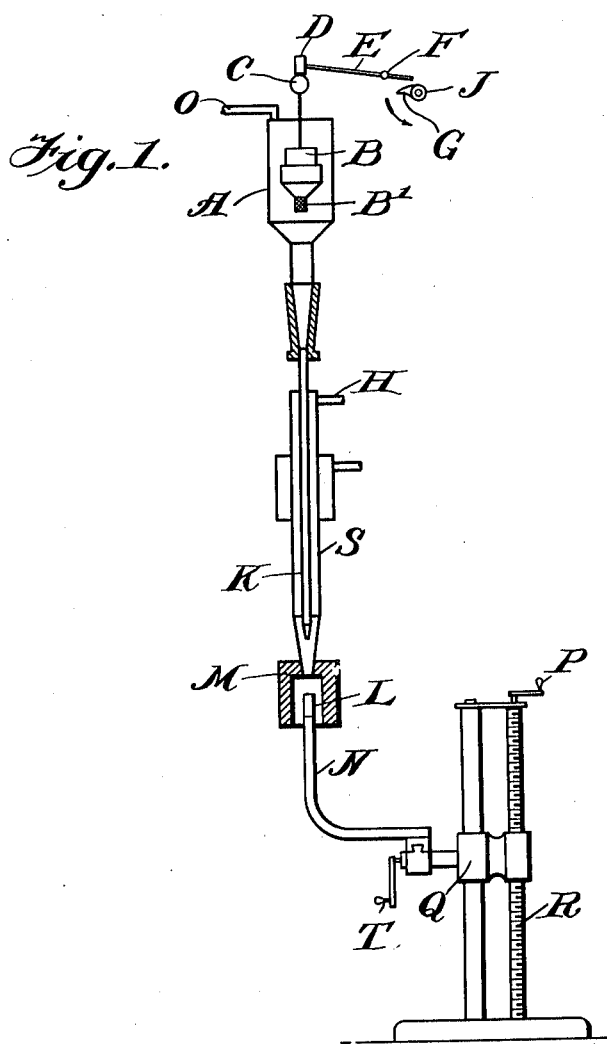

AUGUSTE VICTOR LOUIS VERNEUIL, OF PARIS, FRANCE, ASSIGNOR TO L. HELLER & SON, OF NEW YORK, N. Y.

SYNTHETIC SAPPHIRE.

1,004,505.   Specification of Letters Patent.   Patented Sept. 26, 1911.

Application filed June 28, 1911. Serial No. 635,753.

*To all whom it may concern:*

Be it known that I, AUGUSTE VICTOR LOUIS VERNEUIL, a citizen of the Republic of France, residing at 80 Boulevard street, Germain, Paris, France, have invented certain new and useful Improvements in Synthetic Sapphires; and I do hereby declare the following to be a full, clear, and exact description of the invention, such as will enable others skilled in the art to which it appertains to make and use the same.

This invention relates to artificial sapphires and has for its object to produce synthetically stones having a hardness, color, chemical composition and other physical characteristics as closely resembling the natural sapphire as possible.

As is well known, artificial rubies have already been manufactured synthetically, but prior to my present invention it has been impossible to synthetically produce a sapphire with the true hardness and true color of the natural sapphire, and therefore it has not been heretofore possible to use synthetic sapphires both in the arts and for gems as is now the case.

Therefore, this invention consists in a synthetic sapphire which may be produced in accordance with the disclosure found in my Patent No. 988,230, dated March 28, 1911, which having the same hardness and color as natural sapphires, is useful as an abradent, for other mechanical purposes, as well as being useful as a gem, and which although it is capable of being distinguished from the natural sapphire, it yet possesses the same chemical composition and almost all other physical characteristics, as will be more fully disclosed hereinafter.

Referring to the accompanying drawings forming a part of this specification in which like characters designate like parts in all the views and in which an apparatus suitable for carrying out this invention is illustrated:—Figure 1 is a diagrammatic view of one form of apparatus used, and Figs. 2 to 6 show the artificial sapphire at different stages of the process.

Oxygen is let from a suitable source through the pipe O into the chamber A, which latter contains a receptacle B for the powder, afterward fused into the artificial sapphire. The lower end of this receptacle B terminates in a sieve-like portion B', composed of wire gauze or similar material of sufficiently fine mesh to prevent the powder from falling freely therethrough. The upper end of the receptacle B has attached to it a rod, passing through an air-tight joint in the top of the chamber A, and provided at its upper end with a block C. The block C is placed within reach of a hammer D fixed to a rod E, which is pivotally mounted at F. The end of the rod E opposite to the hammer D is adapted to be periodically depressed by the cam G on the shaft J, which shaft rotates in the direction of the arrow. As the cam G strikes the end of the rod E, the hammer D is raised and when the cam, in its rotation, is disengaged from the rod E, the hammer falls and imparts a shock to the sieve-like portion B' through the block C and the connecting rod. In this way, a small quantity of the powder is delivered at intervals through the opening in the lower part of the chamber A and through the pipe K. The illuminating gas or other suitable fuel is fed through the opening H, passes down through the pipe S, and at the mouth of the latter mingles with the oxygen to form the flame, which is inclosed by a casing M of a refractory substance. Inside of the casing M, is a fire clay column L, which may be adjusted by means of the bent rod N, bracket Q, screw-threaded rod R, and handles P and T.

At the beginning of the process, the oxygen is only fed in small quantities, so that the flame is, relatively speaking, cool. The powder falling through the flame onto the fire clay column or support L is accordingly not fused, but merely baked or fritted, and gradually forms a cone 1 of the shape shown in Fig. 2. As the cone increases in size, the flame acts directly on the point of the cone, which, being a very small mass, is fused and the powder blown in by the flame passes instantaneously to the crystalline state at the moment of fusion, forming a small stalk 2 of the crystalline formation, as shown in Fig. 3. The proportion of oxygen in the flame is then gradually increased and the powder falling down fuses and forms a bulb of gradually increasing size, as shown at 3, 4, and 5 in Figs. 4, 5, and 6. The cone when started is a ball and grows in curved layers by the additions of material. Curved lines due to these layers are often visible to the naked eye in the cut stones. Natural stones do not appear to be formed in this way, since they often disclose straight parallel lines or layers. When the cone is completed the flame is then shut off and the artificial stone allowed to cool. The reactions, so far as I have been able to determine them are as follows: As these substances, mixed together and in a powdered condition, fall through the flame, the reaction first consists in the reduction of the oxid of iron to a lower oxid, and then in the simultaneous oxidation of the lower oxid of iron to the sesquioxid ($Fe_2O_3$) and the reduction of the oxid of titanium to a lower oxid. The blue color of the stone thus ultimately obtained is probably due to the lower oxid of titanium, and the function of the oxid of iron is that of a reducing agent.

When the cone 1, shown in Fig. 2, is formed, the mixture of alumina and the above oxids of iron and titanium then fuses and the artificial sapphire forms gradually, as described above and shown in Figs. 2 to 6. The proportions of the powdered ingredients are substantially 98 per cent. alumina, 1.5 per cent. ferrous oxid of iron, and 0.5 per cent. oxid of titanium. But in making these stones a somewhat larger percentage of iron oxid is used than chemical analysis shows to exist in the finished product. It is therefore believed since the oxid of iron has a lower melting point than corundum, that the excess escapes in a gaseous condition and causes the round shaped bubbles which may be observed, embedded in the body of the synthetic sapphire, if a proper magnifying glass is used, or sometimes even with the unaided eye. In addition to the above, corundum does not become viscous or pasty like glass, and as the flame is at a temperature above its melting point, the stone during its formation at one point or another contains corundum in a gaseous state, and it is believed the finer bubbles observed in the product may be due to this cause.

Other compounds of aluminum, iron and titanium could be used to constitute the ingredients of the powder besides the oxids above mentioned, owing to the fact that the flame, whose temperature during the formation of the stones should be kept at about 1900° C., would reduce any other compounds of these metals which might be used to the state of oxids during their passage through the flame, as at this temperature none of the compounds of these metals are stable, except the oxids. If other compounds of these metals are used, however, the proportions in which they enter into the composition of the powder must obviously be correspondingly changed to give the final proportions above mentioned. It should be understood that it is not absolutely necessary to combine the powdered alumina with the powdered oxids of titanium and iron, which are prepared in the usual manner. One could start with the sulphates, carbonates, or other compounds, or even the pure powdered metals could be used, provided as already stated, that the proportions are correspondingly varied.

The sapphires produced by the above method and means have a hardness of 9, diamond being 10, and may be distinguished on the market from the natural sapphires by observing the following differences in their physical characteristics:—Cracks or scratches are often seen in the natural stones under a high power microscope, but they seem to be on the surface and resemble the parallel scratches made by a file on the edge of a glass plate. They are probably due to the cutting operation. In the synthetic stone, on the other hand, the cracks when they occur, appear as genuine rifts beneath the surface, and are generally curved, due probably to the curved layers out of which the stone is formed. The layers comprising the natural stone are flat and parallel, while those of the synthetic stone are curved, as above stated. The specks or cavity like spots appearing in the natural stone are bounded by angular or crystal shaped walls, while those occurring in the synthetic stone have curved or bubble like walls. The above characteristics in nearly all cases must be looked for with a high power miscroscope. When cut, however, the transparency, and other optical properties of the natural and synthetic stones may be considered identical.

It will be seen from the foregoing that by this invention, gems may be produced having all the qualities for which natural gems are valued, and also since the hardness is 9, diamond being 10, the said stones may be substituted in the arts for the natural stones. In fact, these stones may be manufactured at a cost enabling them to be used either as gems, or in the various mechanic arts, and therefore, I do not wish to be limited to any particular use.

What I claim is:—

1. A synthetic sapphire containing aluminum, iron and titanium, having beneath its surfaces bubble like spots bounded with rounded walls, substantially as described.

2. A synthetic sapphire containing aluminum, iron and titanium, and having beneath its surfaces bubble like spots bounded with rounded walls, and also curved rift like streaks or cracks, substantially as described.

3. A synthetic sapphire containing aluminum, iron and titanium of a bluish color, having a hardness of substantially 9, diamond being 10, and having beneath its surfaces bubble like spots bounded with rounded walls, substantially as described.

4. A cut and finished synthetic sapphire containing the oxids of aluminum, iron and titanium, having the same color transparency and hardness as the natural sapphire, but distinguishable therefrom by having embedded in its body portion and beneath its surface bubble like spots bounded with rounded walls, substantially as described.

5. A synthetic sapphire containing aluminum, iron and titanium, having beneath its surfaces bubble like spots bounded with rounded walls, and also containing curved layers in its body portion, substantially as described.

In testimony whereof, I affix my signature, in presence of two witnesses.

AUGUSTE VICTOR LOUIS VERNEUIL.

Witnesses:
   LOUIS RINUY,
   H. C. COXE.